(12) United States Patent
Mossman (10) Patent No.: US 9,750,190 B2
(45) Date of Patent: Sep. 5, 2017

(54) HARVESTING HEAD UPPER BELT CONVEYOR COMPRESSING CROP AGAINST A CENTER BELT CONVEYOR

(71) Applicant: Deere & Company, Moline, IL (US)

(72) Inventor: Michael W. Mossman, Silvis, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/146,004

(22) Filed: May 4, 2016

(65) Prior Publication Data

US 2016/0242358 A1    Aug. 25, 2016

Related U.S. Application Data

(63) Continuation-in-part of application No. 14/103,279, filed on Dec. 11, 2013, now abandoned.

(51) Int. Cl.
*A01D 43/00*    (2006.01)
*A01D 61/00*    (2006.01)
*A01D 61/02*    (2006.01)

(52) U.S. Cl.
CPC ......... *A01D 61/008* (2013.01); *A01D 61/002* (2013.01); *A01D 61/02* (2013.01)

(58) Field of Classification Search
CPC ...... A01D 57/20; A01D 61/008; A01D 41/14; A01D 61/002; A01D 61/02
USPC .................................................. 56/153, 181
See application file for complete search history.

(56) References Cited

U.S. PATENT DOCUMENTS

| | | | | |
|---|---|---|---|---|
| 597,635 A | * | 1/1898 | Coombs | A01D 57/20 217/65 |
| 1,380,636 A | * | 6/1921 | Clove | A01D 61/008 460/114 |
| 1,489,961 A | * | 4/1924 | Orth | A01D 61/002 56/181 |
| 1,553,584 A | * | 9/1925 | Anderson | A01D 61/008 56/123 |
| 1,624,703 A | * | 4/1927 | Witte | A01D 61/002 100/151 |
| 2,133,396 A | * | 10/1938 | Neal | A01D 61/008 198/599 |
| 2,312,838 A | * | 3/1943 | Johnston | A01D 61/008 241/DIG. 30 |
| 2,427,876 A | * | 9/1947 | Pool | A01D 61/008 198/511 |

(Continued)

FOREIGN PATENT DOCUMENTS

DE    3419516 A1  * 11/1985  ........... A01D 43/082
EP    1915897 A1    4/2008

(Continued)

OTHER PUBLICATIONS

European Search Report issued in counterpart application No. 14190200.7, dated May 13, 2015 (6 pages).

*Primary Examiner* — Árpád Fábián-Kovács
(74) *Attorney, Agent, or Firm* — Rathe Lindenbaum LLP (57) ABSTRACT

An agricultural harvesting head (100) has a frame (102) that extends laterally and is elongate; a left side conveyor (106); a right side conveyor (110); a center conveyor (108, 144); and an upper conveyor (118) of an endless belt type that is disposed to receive, engage and downwardly compress an upper surface of the cut crop material conveyed rearwardly by the center conveyor (108, 144).

17 Claims, 6 Drawing Sheets

(56) References Cited

U.S. PATENT DOCUMENTS

| | | | | |
|---|---|---|---|---|
| 2,841,945 | A * | 7/1958 | Brenner | A01D 41/00 460/111 |
| 3,217,473 | A * | 11/1965 | Lawrie | A01D 57/20 56/14.4 |
| 3,967,719 | A * | 7/1976 | Kloefkorn | A01D 61/008 198/550.12 |
| 5,464,371 | A * | 11/1995 | Honey | A01D 57/20 460/20 |
| 5,497,605 | A * | 3/1996 | Underwood | A01D 34/30 460/101 |
| 5,722,225 | A * | 3/1998 | Wuebbels | A01D 43/082 56/119 |
| 6,865,871 | B2 * | 3/2005 | Patterson | A01D 57/20 56/14.5 |
| 7,587,885 | B2 * | 9/2009 | Tippery | A01D 57/20 56/14.5 |
| 8,166,738 | B1 * | 5/2012 | Coers | A01D 61/002 56/181 |
| 8,434,290 | B2 * | 5/2013 | Barnett | A01D 34/668 56/157 |
| 8,800,254 | B2 * | 8/2014 | Stephenson | A01D 43/077 56/192 |
| 8,833,046 | B2 * | 9/2014 | Barnett | A01D 34/71 56/157 |
| 2002/0129591 | A1 * | 9/2002 | Patterson | A01D 57/20 56/158 |
| 2004/0148919 | A1 * | 8/2004 | Dunn | A01D 57/20 56/16.4 R |
| 2004/0250523 | A1 * | 12/2004 | Schulz | A01F 12/10 56/153 |
| 2005/0016147 | A1 * | 1/2005 | Patterson | A01D 57/20 56/181 |
| 2005/0284124 | A1 * | 12/2005 | Patterson | A01D 61/008 56/364 |
| 2007/0119140 | A1 * | 5/2007 | Gette | A01D 89/008 56/364 |
| 2007/0238565 | A1 * | 10/2007 | Marler | A01D 43/077 474/237 |
| 2007/0251203 | A1 * | 11/2007 | Coers | A01D 61/02 56/181 |
| 2008/0016837 | A1 * | 1/2008 | Rosenbalm | A01D 57/30 56/192 |
| 2008/0098705 | A1 * | 5/2008 | Salley | A01D 61/002 56/16.4 R |
| 2008/0295474 | A1 * | 12/2008 | Tippery | A01D 57/20 56/14.5 |
| 2009/0308042 | A1 * | 12/2009 | Lovett | A01D 57/20 56/153 |
| 2011/0005181 | A1 * | 1/2011 | Barnett | A01D 34/664 56/157 |
| 2011/0094201 | A1 * | 4/2011 | Bomleny | A01D 61/02 56/181 |
| 2012/0047866 | A1 * | 3/2012 | Fuechtling | A01D 61/002 56/153 |
| 2013/0313077 | A1 * | 11/2013 | Boyd | A01D 61/008 198/617 |
| 2014/0157743 | A1 * | 6/2014 | Isfort | A01D 61/00 56/10.1 |
| 2014/0174048 | A1 * | 6/2014 | Lawson | A01D 45/003 56/13.9 |
| 2014/0290200 | A1 * | 10/2014 | Trowbridge | A01D 41/1274 56/11.2 |
| 2015/0121830 | A1 * | 5/2015 | Gahres | A01D 57/20 56/153 |

FOREIGN PATENT DOCUMENTS

| | | | | |
|---|---|---|---|---|
| EP | | 2586288 A1 | 5/2013 | |
| WO | WO | 8502315 A | * 6/1985 | A01D 57/20 |
| WO | WO | 8502316 A | * 6/1985 | A01F 12/10 |

* cited by examiner

HARVESTING HEAD UPPER BELT CONVEYOR COMPRESSING CROP AGAINST A CENTER BELT CONVEYOR

RELATED APPLICATIONS

This application claims priority from U.S. patent application Ser. No. 14/103,279 which was filed on Dec. 11, 2013.

FIELD OF THE INVENTION

The invention relates to agricultural harvesting equipment. More particularly, it relates to agricultural harvesting heads. Even more particularly it relates to feed systems for agricultural harvesting heads.

BACKGROUND OF THE INVENTION

Harvesting heads of the draper type use endless belt conveyors to move crop material inwardly from the ends of the harvesting head to a central region of the harvesting head, and then rearwardly from a central region, underneath a feed roller, and then through an aperture in the back of the harvesting head and into a feederhouse that extends forward from the agricultural combine on which the agricultural harvesting head is mounted.

The feed roller engages the top surface of the crop mat being fed rearward from the two side conveyors. Several adaptations of been tried over the years, including fingers fixed to the outside surface of the feed roller, fingers that extend and retract into the feed roller based upon its rotational position, and fingers that extend and retract into the feed roller disposed at an angle to sweep in material from the outer ends of the feed roller.

None of these have been completely satisfactory.

What is needed therefore is an improved feed system for harvesting head. It is an object of this invention to provide such a system.

SUMMARY OF THE INVENTION

In accordance with a first aspect of the invention, an agricultural harvesting head is provided that comprises: a frame that extends laterally and is elongate; a left side conveyor that is supported on a left side of the frame and is configured to carry cut crop material laterally from a left side of the frame to a central region of the frame; a right side conveyor that is supported on a right side of the frame and is configured to carry cut crop material laterally from a right side of the frame to the central region of the frame; a center conveyor that is disposed to receive cut crop material from the left side conveyor and from the right side conveyor and to convey the cut crop material rearwardly, wherein the center conveyor is supported on the central region of the frame; and an upper conveyor of the endless belt type that is disposed to receive, engage and downwardly compress an upper surface of the cut crop material conveyed rearwardly by the center conveyor wherein the upper conveyor and the center conveyor are adapted to convey the cut crop material rearward and into a feederhouse and an internal feederhouse conveyor of an agricultural combine.

The left side conveyor, and the right side conveyor may be of the endless belt type.

The agricultural harvesting head may further comprise a left side diverter roller disposed adjacent to the left front of the upper conveyor to deflect cut crop material from the left side conveyor onto the center conveyor, and further comprising a right side diverter roller disposed adjacent to the right front of the upper conveyor to deflect cut crop material from the right side conveyor on to the center conveyor.

The upper conveyor may be disposed above the center conveyor.

The upper conveyor may comprise an endless belt, and the endless belt of the upper conveyor may have a generally vertical belt portion that is configured to engage an upper portion of a mat of the cut crop material and draw the mat downward.

The endless belt of the upper conveyor may have a downwardly and rearwardly moving belt portion that is configured to receive the mat of cut crop material from the generally vertical belt portion and to further compress the mat of cut crop material as the endless belt of the upper conveyor draws the mat downward and rearward.

The center conveyor may comprise an endless belt, the endless belt may be configured to compress the mat of cut crop material between the downwardly and rearwardly moving belt portion and the endless belt of the center conveyor as both the upper conveyor and the center conveyor are driven toward the rear of the harvesting head.

A rearmost roller of the center conveyor and a rearmost roller of the upper conveyor may be disposed at the rear of an inside the frame of the agricultural harvesting head.

An endless belt of the upper conveyor may have three regions, including a first region that is generally vertical, a second region that extends downwardly and rearwardly, and a third region that extends generally horizontally, and these three regions may be defined by a plurality of conveyor rollers about which the endless belt of the upper conveyor is wrapped.

The left side diverter roller and the right side diverter roller may each comprise an elongate body that is generally cylindrical and extends vertically, and a plurality of longitudinally extending ribs that are fixed to and extend outward from an outer surface of the body.

The left side diverter roller and the right side diverter roller may further comprise a plurality of elongate protrusions extending outward from a lower portion of the elongate body.

The upper conveyor may be disposed above the center conveyor on the agricultural harvesting head, and the upper conveyor may be adapted to be supported on the feeder house forward of the feeder house and forward of the internal feeder house conveyor.

The upper conveyor may be disposed to receive, engage and downwardly compress an upper surface of the cut crop material against an endless belt of the center conveyor.

BRIEF DESCRIPTION OF THE DRAWINGS

FIG. 6 is a left side view of the harvesting head supported on a feeder house and on the agricultural combine which the feeder house is pivotally supported on.

DETAILED DESCRIPTION OF THE PREFERRED EMBODIMENTS

Figure 1:
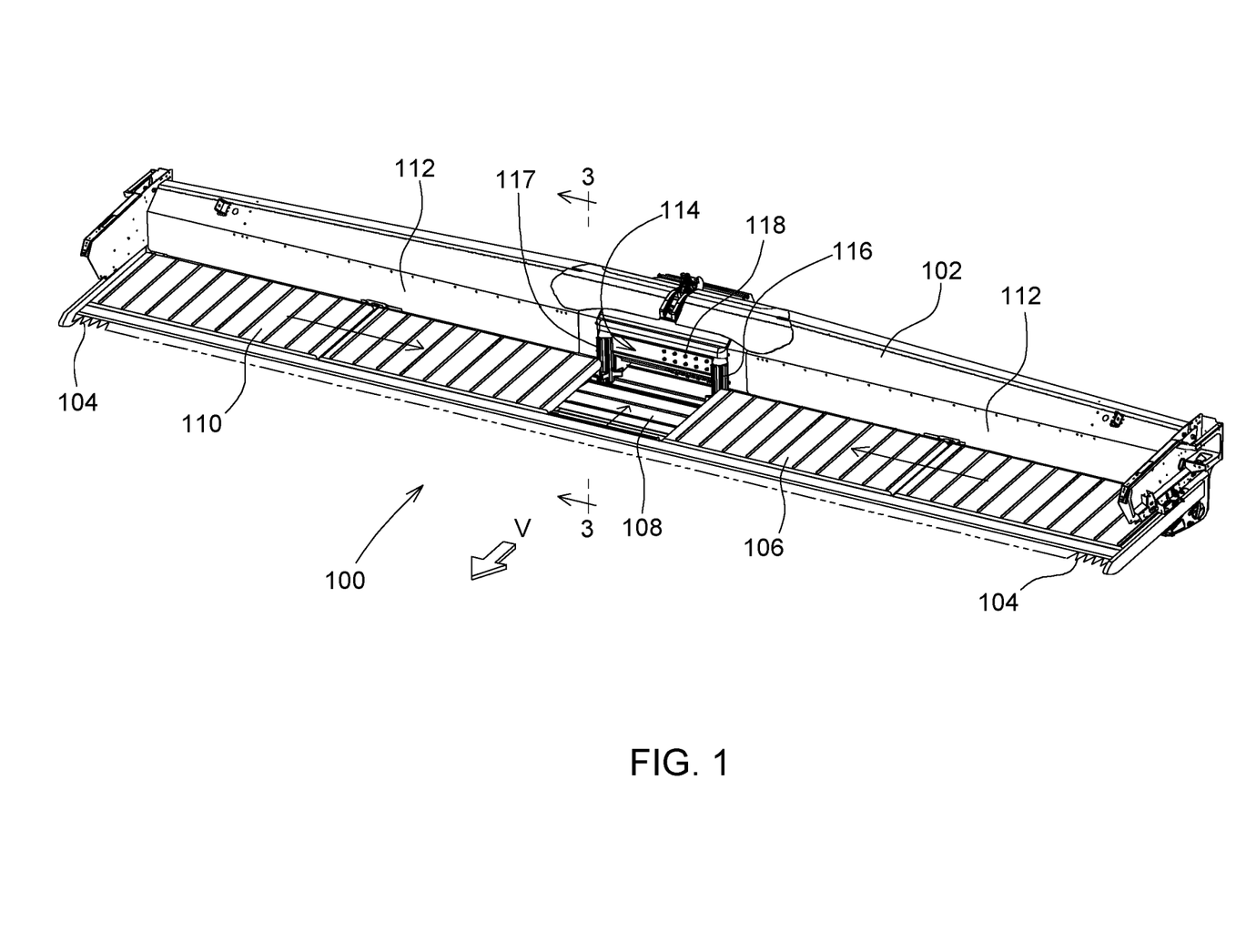
FIG. 1 is a perspective view of a harvesting head in accordance with the present invention.
Figure 2:
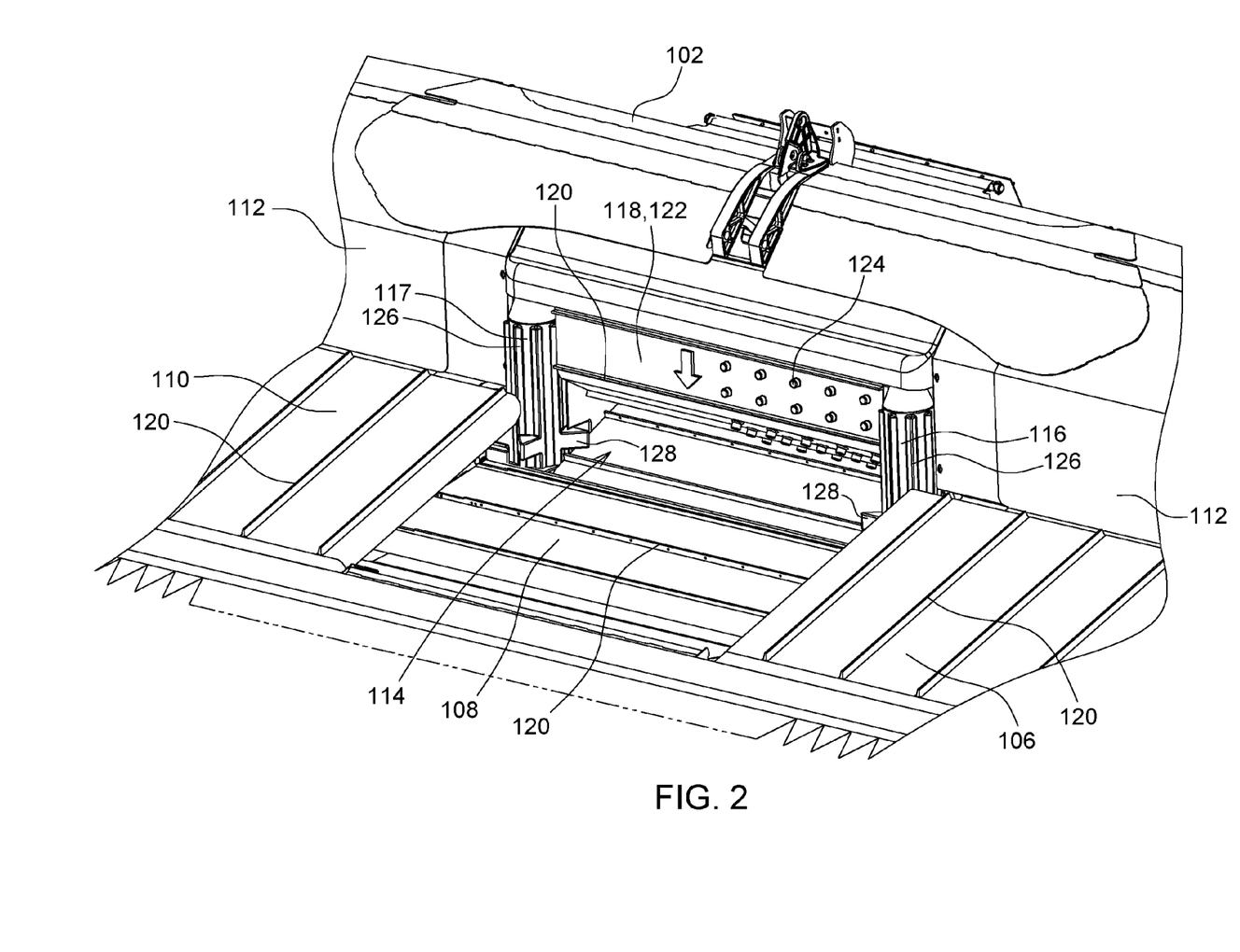
FIG. 2 is a detailed fragmentary perspective view of a central region of the harvesting head of FIG. 1 taken from the same perspective.

FIGS. 1 and 2 show a harvesting head 100. The harvesting head 100 comprises a frame 102 and a rear wall 112. The frame 102 supports the rear wall 112.

The rear wall 112 has an aperture 114 passing therethrough from the front of the harvesting head 100 through to the rear of the harvesting head 100.

The harvesting head 100 further comprises a left side conveyor 106, a right side conveyor 110, and the center conveyor 108. The center conveyor 108, the right side conveyor 110, and the center conveyor 108 are all endless belt conveyors. Each conveyor is supported on at least two rollers (not shown) at least one of which is a drive roller that is driven in rotation by a motor. The conveyors convey crop material in the directions indicated by the arrows superimposed on the surfaces of the endless belts.

The harvesting head 100 further comprises a reciprocating knife 104 that is elongate, and extends across substantially the entire width of the harvesting head 100. The reciprocating knife 104 is fixed to a leading edge of the frame 102 and extends forward therefrom.

The harvesting head 100 further comprises a left side diverter roller 116 and a right side diverter roller 117 that are disposed on opposite sides of the center conveyor 108 where the rear edge of the endless belt of the center conveyor 108, and the rear edge of the endless belt of the right side conveyor 110 meets the left edge, and the right edge of the center conveyor 108.

The harvesting head 100 further comprises an upper conveyor 118 that is disposed above the center conveyor 108 in place of the traditional feed roller. The upper conveyor 118 is of the endless belt type and is disposed to engage the upper surface of cut crop material on the center conveyor 108 and compress it so it can be transmitted through the aperture 114 and into the feederhouse (see FIGS. 5, 6) of the agricultural combine.

In operation, an agricultural combine (not shown) supports the harvesting head 100 on couplers that extend into the left side conveyor 106 to engage and support and right side diverter roller 117. The agricultural combine conveys the harvesting head 100 through the field in the direction "V" indicated in FIG. 1. The direction "V" is perpendicular to the longitudinal extent of the harvesting head 100.

As the harvesting head 100 is carried to the field, the reciprocating knife 104 severs crop plants near the ground, causing the crop plants to fall rearward onto the upper surfaces of the endless belts of the center conveyor 108, the right side conveyor 110, and the center conveyor 108.

The cut crop material falling on the left side conveyor 106 is conveyed to a central region of the harvesting head 100. The cut crop material falls off the inner end of the left side conveyor 106 and onto the top surface of the endless belt of the center conveyor 108.

The cut crop material falling on the right side conveyor 110 is conveyed to the central region of the harvesting head 100. The cut crop material falls off the inner end of the right side conveyor 110 and onto the top surface of the endless belt of the center conveyor 108.

The cut crop material falling on the center conveyor 108 is carried rearward and toward the upper conveyor 118.

The left side diverter roller 116 extends vertically and is disposed at the inner rear corner of the left side conveyor 106. As cut crop material falls from the left side conveyor 106 onto the center conveyor 108 it is steered in a rearward direction by the action of the conveyor belts. The left side diverter roller is disposed in front of the rear wall 112 to assist the cut crop material as it rounds the corner and is propelled by the conveyor belts of the upper conveyor 118 and the center conveyor 108 into the aperture 114. The left side diverter roller 116 is generally cylindrical, is supported in a vertical position and is permitted to rotate about a vertical axis extending to the longitudinal center of the left side diverter roller 116. Longitudinal and vertically extending ribs 126 are disposed on the outer surface of the left side diverter roller 116. The lower portion of the left side diverter roller 116 has a plurality of protrusions 128 that extend outwardly therefrom to a distance greater than an outward extent of the ribs 126. These protrusions 128 are distributed evenly about the circumference of the left side diverter roller 116.

The right side diverter roller 117 is constructed and functions in a manner identical to the left side diverter roller 116, but in mirror image form.

The upper conveyor 118 comprises an endless belt 122 that is disposed above the mat of cut crop material traveling rearwardly on the center conveyor 108. The endless belt 122 is a fabric-reinforced elastomer-impregnated belt. The endless conveyor belt may have a smooth outer surface, or it may be provided with a plurality of protrusions that extend outwardly therefrom. These protrusions may include laterally extending spaced apart ribs 120 and/or nubs 124.

Figure 3:
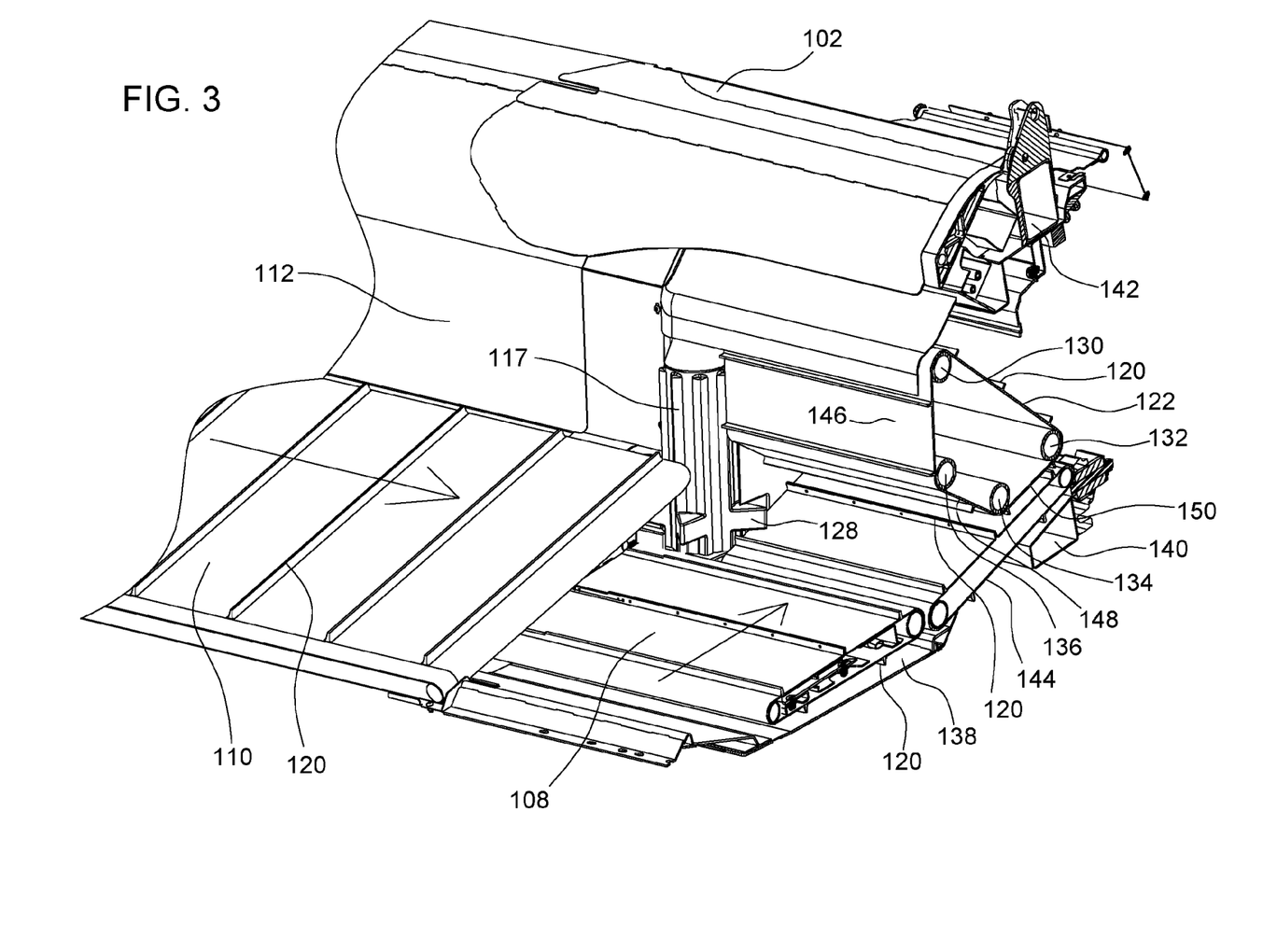
FIG. 3 is a detailed fragmentary cross sectional perspective view through a central region of the harvesting head of FIGS. 1-2 taken at section line 3-3 in FIG. 1.
Figure 4:
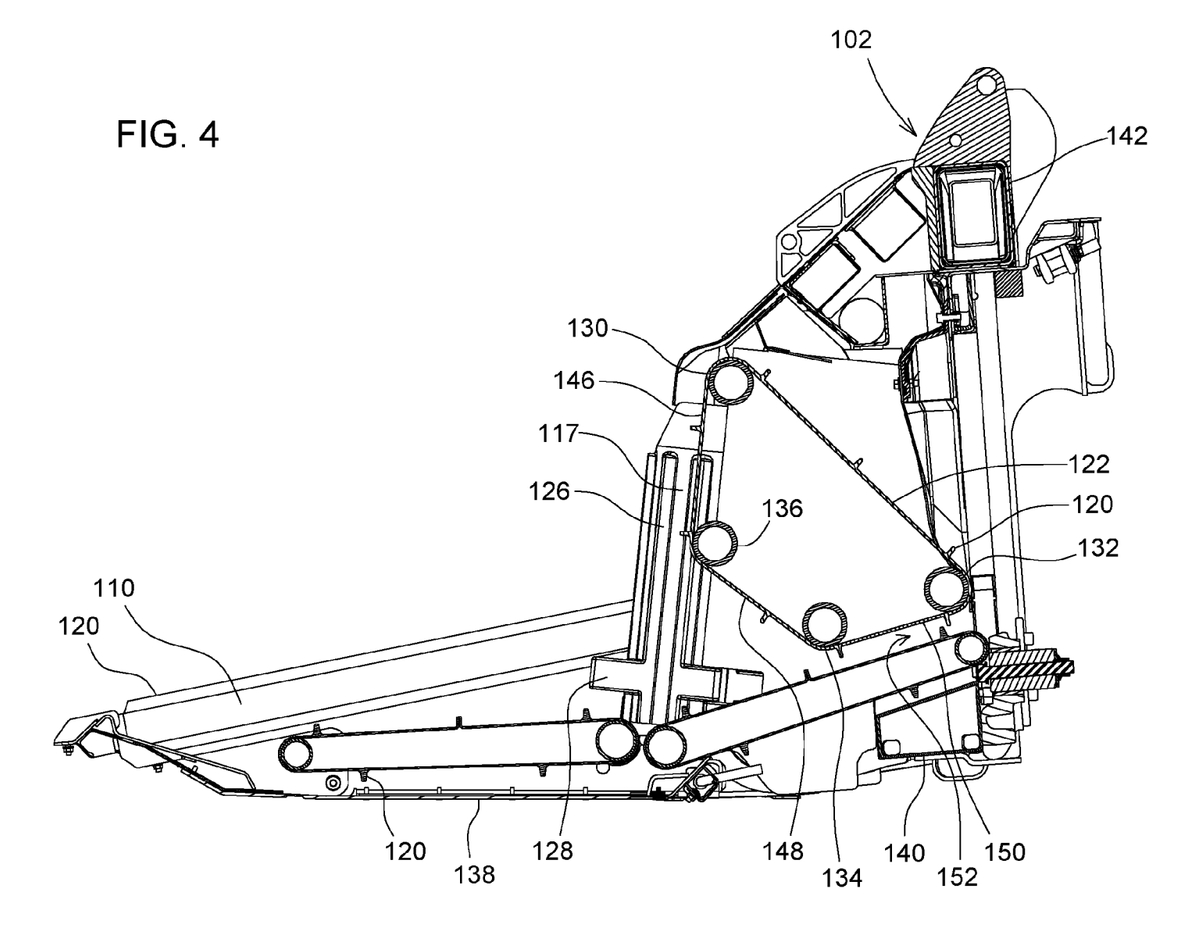
FIG. 4 is a left side view of the cross section of FIG. 4.

FIGS. 3 and 4 illustrate a cross-section of the harvesting head 100 taken along a longitudinal and vertical centerline of the harvesting head 100. The reciprocating knife 104 has been removed to show details otherwise obscured by the reciprocating knife 104.

From these figures it can be seen that the center conveyor 108 is supported on a front roller and a rear roller that are disposed above a floor pan 138. The endless belt of the center conveyor 108 recirculates about the front roller in the rear roller. The center conveyor 108 terminates adjacent to the rear wall 112.

Behind the center conveyor 108 is a second center conveyor 144 constructed essentially the same as the center conveyor 108.

The front roller of the second center conveyor 144 is disposed generally between the left side diverter roller 116 and the right side diverter roller 117, adjacent to the rear edge of the endless belt of the left side conveyor 106 and adjacent to the rear edge of the endless belt of the right side conveyor 110 and at the forward end of the endless belt of the upper conveyor 118.

The rear roller of the second center conveyor 144 is disposed generally between the left side diverter roller 116 and the right side diverter roller 117, adjacent to the rear end of the endless belt of the upper conveyor 118, at the rear of the harvesting head 100, and vertically between a lower beam member 140 of the frame 102 and an upper beam member 142 of the frame 102.

The second center conveyor 144 has an upper surface that receives cut crop material conveyed rearward from the center conveyor 108 and conveys it further rearward, underneath the upper conveyor 118.

The front roller and the rear roller of the second center conveyor 144 extend laterally, parallel to the longitudinal extent of the harvesting head 100. The front roller of the second center conveyor 144 is disposed generally at the same height as the rear roller of the center conveyor 108. In this manner, cut crop material conveyed rearward on the center conveyor 108 can be conveyed with little or no restriction from the center conveyor 108 to the second center conveyor 144.

The endless belt 122 of the upper conveyor 118 is supported on four rollers: an upper front roller 130, a lower rear roller 132, a lower compression roller 134 and an upper compression roller 136. At least one of these rollers is driven in rotation by a motor (not shown) of conventional arrangement. All of these rollers extend laterally generally parallel to the longitudinal extent of the harvesting head 100.

A belt portion 146 of the endless belt 122 is configured to move downwardly as it travels from the upper roller 132 the upper compression roller 136. The belt portion 142 extends between (and is supported on and positionally defined by) the upper front roller 130 and the upper compression roller 136. The belt portion 146 extends generally vertically and the outer and crop engaging surface of the belt faces forwardly.

The belt portion 146 is disposed to engage the upper portion of the mat of cut crop material traveling on the center conveyor 108 and transitioning on to the second center conveyor 144 and to draw this upper portion of the map downward with the spaced apart ribs 120. This slightly compresses the relatively fluffy mat of cut crop material.

A belt portion 148 of the endless belt 122 is configured to move downwardly and rearwardly as it travels from the upper compression roller 136 to the lower compression roller 134. The belt portion 148 extends between (and is supported on and positionally defined by) the upper compression roller 136 and the lower compression roller 134. The belt portion 148 extends in a downward and rearward direction. The crop engaging surface of the belt portion 148 faces forwardly and downwardly.

The belt portion 148 is disposed behind and below the belt portion 146, whereby it can engage the mat of cut crop material after it has been slightly compressed by the belt portion 146. The belt portion 148 moves downwardly and rearwardly as it travels from the upper compression roller 136 to the lower compression roller 134. This orientation a direction of travel permits the belt portion 148 to apply more pressure to the mat of cut crop material and thereby compress the mat of cut crop material even more. This downward and rearward orientation and movement of the belt portion 148 permits the web of the endless belt 122 as well as the spaced apart ribs 120 to apply compressive forces and frictionally engage the mat of cut crop material. The belt portion 148 compresses the mat of cut crop material between the endless belt 122 of the upper conveyor 118 and the endless belt of the second center conveyor 144. Both of these endless belts act in opposition to each other and the space between the endless belts narrows as the endless belts are drawn rearward.

A belt portion 150 of the endless belt 122 is configured to move rearwardly as it travels from the lower compression roller 134 to the lower rear roller 132. The belt portion 150 extends between (and is supported on and positionally defined by) the lower compression roller 134 and the lower rear roller 132.

The belt portion 150 and the crop engaging surface of the belt portion 150 extends generally horizontally and generally parallel to a crop engaging surface of a facing belt portion of the second center conveyor 144.

The belt portion 150 has a crop engaging surface that faces downwardly. A gap 152 is provided between the downwardly facing crop engaging surface of the belt portion 150 and the upwardly facing crop engaging surface of the endless belt of the second center conveyor 144.

As the endless belt of the second center conveyor 144 travels around the rear roller of the second conveyor 144 and as the endless belt of the upper conveyor 118 travels around the lower rear roller 132, the compressed crop material is released from between the two conveyors and is conveyed rearwardly as a thick, compressed mat into the opening of the feederhouse (not shown) on which the harvesting head 100 is supported.

In an alternative arrangement, the center conveyor 108 and the second center conveyor 144 can be configured differently and be provided with a single endless belt that recirculates between the front roller of the center conveyor 108 and the rear roller of the second center conveyor 144. In this manner, only a single belt would need replacement instead of two. Additionally, this would allow the rear roller of the center conveyor 108 and the front roller of the second center conveyor 144 to be eliminated.

Figure 5:
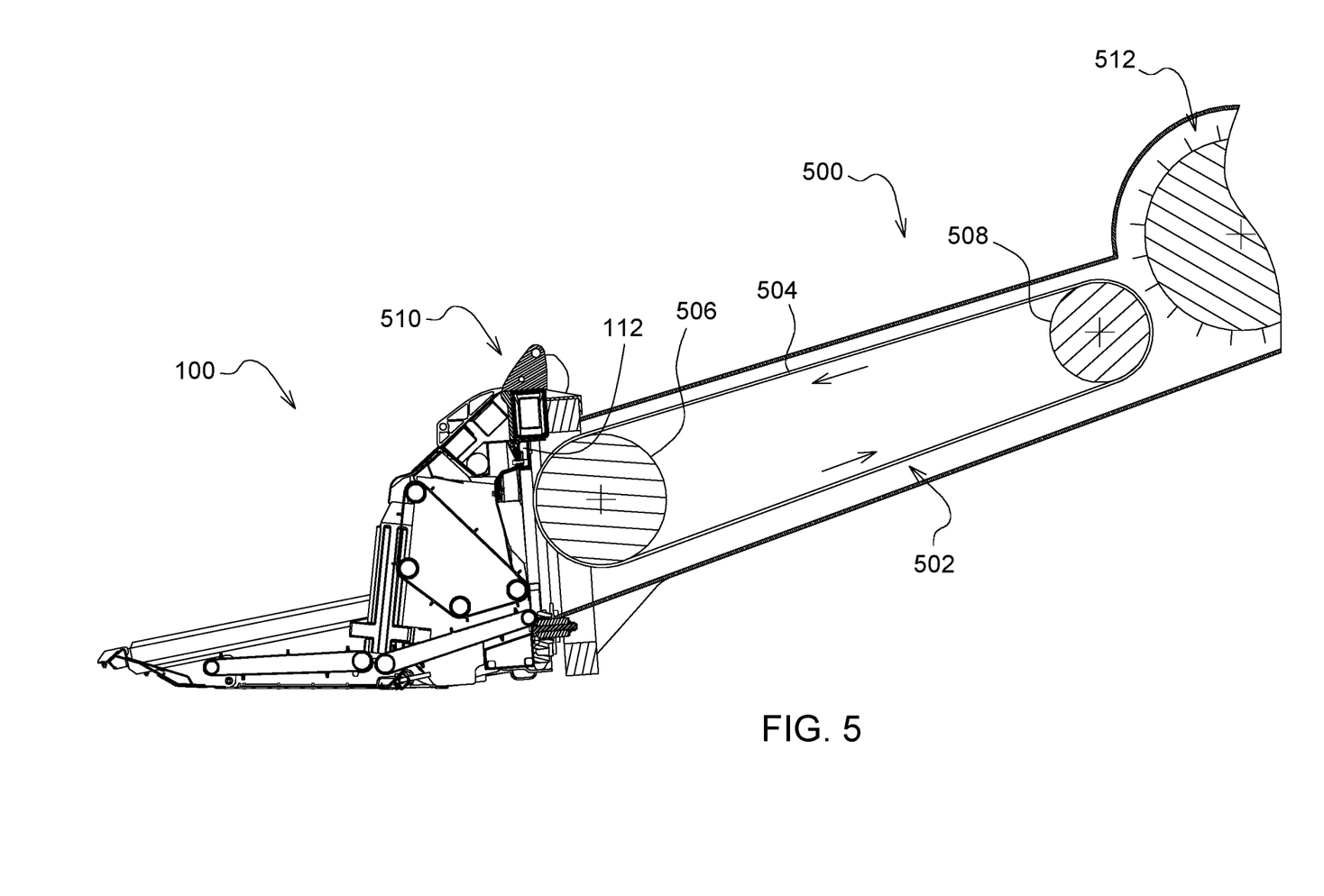
FIG. 5 is a left side view of the cross-section of FIG. 4 showing the harvesting head supported on a feeder house.
Figure 6:
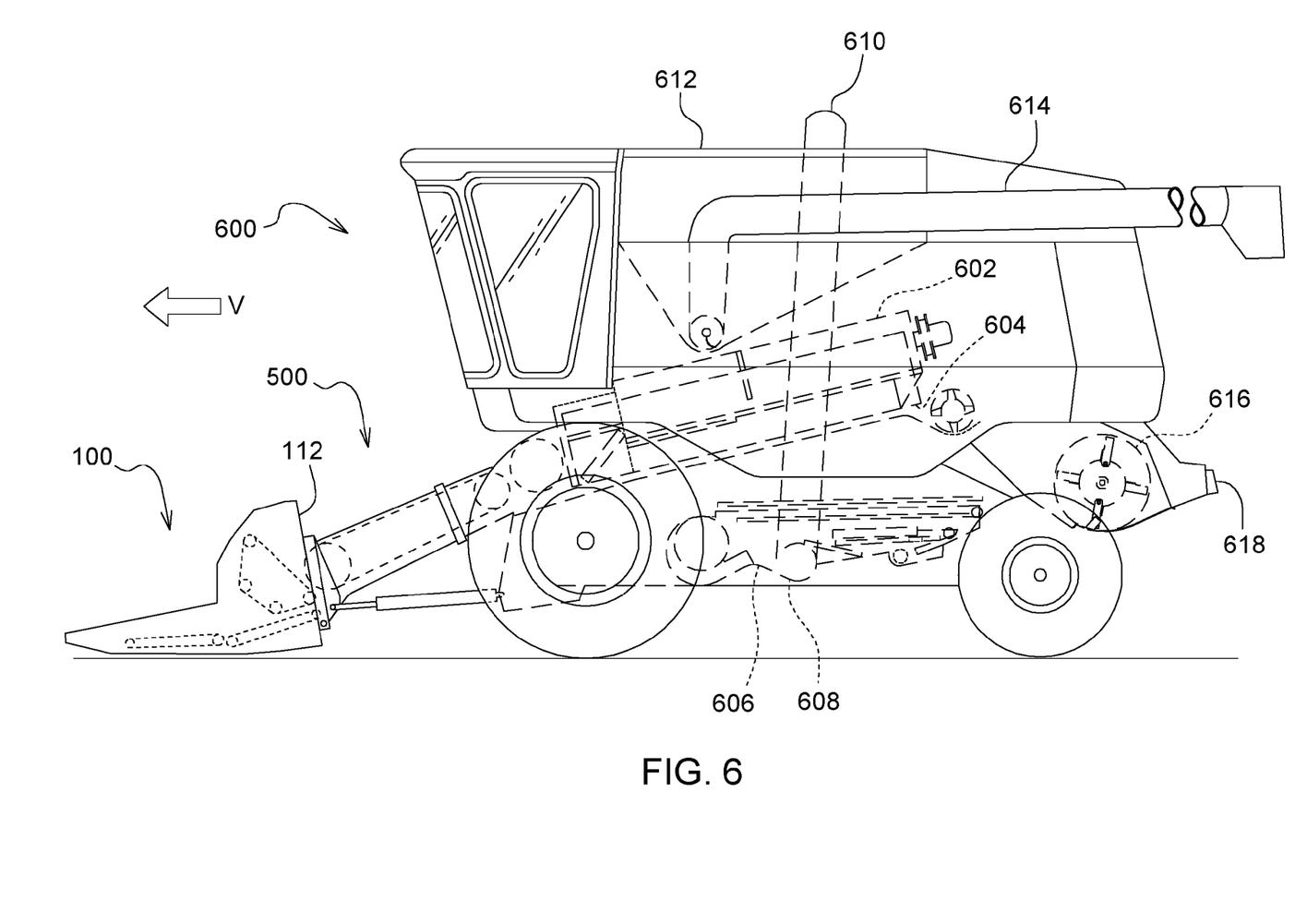

In FIGS. 5 and 6, the harvesting head 100 is shown supported on a feeder house 500. The feeder house 500 is of conventional arrangement and includes an internal conveyor 502 comprising an endless belt or chain 504 that is supported on a lower roller 506 and an upper roller 508 for recirculating movement in the direction indicated by the arrows in FIG. 5. The feeder house 500 forms a generally rectangular box in rectangular cross-section that extends upwardly and rearwardly. The feeder house 500 is disposed immediately behind the rear wall 112 in the aperture 114 in the rear wall. The harvesting head 100 is removably supported on hooks 510 located at a forward portion of the feeder house 500. The hooks 510 support the harvesting head 100 on the feederhouse 500. The hooks align the aperture 114 is the rear wall of the harvesting head 100 through which the crop material exists the harvesting head 100 with the front opening of the feederhouse 500, thereby aligning the crop material outlet in the harvesting head 100 with the crop material inlet defined by the open end of the feederhouse.

The feeder house 500 receives cut crop conveyed by the center conveyor 108 and the upper conveyor 118 through the aperture 114 formed in the rear wall 112 and conveys it upward and into a feed accelerator 512.

The feed accelerator 512 conveys the cut crop material into a gap between a rotor 602 and a concave 604. The rotor 602 is driven in rotation to thresh and separate the crop, which falls onto a cleaning shoe 606. A sieve and chaffer in the cleaning shoe separate the grain from the material other than grain. Clean grain falls down into an auger trough 608. An auger disposed in the auger trough 608 conveys the material to one side of the combine whereupon it is lifted by a clean grain elevator 610 and deposited in a grain tank 612. When the agricultural combine 600 is ready to be unloaded, an unloading auger 614 is pivoted away from the side of the vehicle and the clean grain is dumped into a grain cart traveling alongside the agricultural combine 600. The material other than grain is chopped in a chopper 616 and is spread over the ground by steering vanes 618.

I claim:

1. An agricultural harvesting head comprising:
  a frame that extends laterally and is elongate;
  a left side conveyor that is supported on a left side of the frame and is configured to carry cut crop material laterally from a left side of the frame to a central region of the frame;

a right side conveyor that is supported on a right side of the frame and is configured to carry cut crop material laterally from a right side of the frame to the central region of the frame;

a center conveyor that is disposed to receive cut crop material from the left side conveyor and from the right side conveyor and to convey the cut crop material rearwardly, wherein the center conveyor is supported on the central region of the frame; and an upper conveyor of an endless belt type that is disposed to receive, engage and downwardly compress an upper surface of the cut crop material conveyed rearwardly by the center conveyor;

wherein the upper conveyor and the center conveyor are adapted to convey the cut crop material rearward and into a feederhouse and an internal feederhouse conveyor of an agricultural combine and wherein the upper conveyor is disposed to receive, engage and downwardly compress an upper surface of the cut crop material against an endless belt of the center conveyor, wherein the agricultural harvesting head further comprising a left side diverter roller disposed adjacent to the left front of the upper conveyor to deflect cut crop material from the left side conveyor directly onto the center conveyor, and further comprising a right side diverter roller disposed adjacent to the right front of the upper conveyor to deflect cut crop material from the right side conveyor directly onto the center conveyor, wherein the head has a rear to be removably mounted to a front of a feeder housing, wherein the left side diverter roller and the right side diverter roller each comprise an elongate body that is generally cylindrical and extends vertically, and a plurality of longitudinally extending ribs that are fixed to and extend outward from an outer surface of the elongate body and wherein the upper conveyor and the center conveyor extend rearward of the left side diverter roller and the right side diverter roller and forward the rear of the head.

2. The agricultural harvesting head of claim 1, wherein the left side conveyor, and the right side conveyor are of the endless belt type.

3. The agricultural harvesting head of claim 1, wherein the upper conveyor is disposed above and directly over the center conveyor.

4. The agricultural harvesting head of claim 1, wherein the upper conveyor comprises an endless belt, and further wherein the endless belt of the upper conveyor has a generally vertical belt portion that is configured to engage an upper portion of a mat of the cut crop material and draw the mat downward.

5. The agricultural harvesting head of claim 4, wherein the endless belt of the upper conveyor has a downwardly and rearwardly moving belt portion that is configured to receive the mat of the cut crop material from the generally vertical belt portion and further compress the mat of the cut crop material as it draws the mat of the cut crop material downward and rearward.

6. The agricultural harvesting head of claim 5, wherein the center conveyor comprises a second endless belt, and further wherein the mat of the cut crop material is compressed between the downwardly and rearwardly moving belt portion and the endless belt of the center conveyor as both the upper conveyor and the center conveyor are driven toward the rear of the agricultural harvesting head.

7. The agricultural harvesting head of claim 1, wherein the frame is configured to be removably mounted to hooks of the feeder house and wherein a rearmost roller of the center conveyor and a rearmost roller of the upper conveyor are disposed at the rear of an inside of the frame of the agricultural harvesting head.

8. The agricultural harvesting head of claim 1, wherein an endless belt of the upper conveyor has three regions, including a first region that is to be driven in a generally vertical direction, a second region that is to be driven downwardly and rearwardly, and a third region that that is to be driven generally horizontally, and further comprising three conveyor rollers about which the endless belt of the upper conveyor is wrapped.

9. The agricultural harvesting head of claim 1, wherein the left side diverter roller and the right side diverter roller further comprise a plurality of elongate protrusions extending outward from a lower portion of the elongate body.

10. The agricultural harvesting head of claim 1 wherein the upper conveyor is disposed above, over and opposite to the center conveyor on the agricultural harvesting head, and further wherein the upper conveyor is adapted to be supported on the feeder house forward of the feeder house and forward of the internal feeder house conveyor.

11. The agricultural harvesting head of claim 1, wherein the head has a rear to be removably mounted to a front of a feeder housing having an input opening and wherein the center conveyor and the upper conveyor are configured to extend forward of the front of the feeder housing when the head is mounted to the feeder housing so as to convey the cut crop material rearwardly into the input opening of the feeder housing.

12. An agricultural harvesting head comprising:
a frame that extends laterally and is elongate;
a left side conveyor that is supported on a left side of the frame and is configured to carry cut crop material laterally from a left side of the frame to a central region of the frame;
a right side conveyor that is supported on a right side of the frame and is configured to carry cut crop material laterally from a right side of the frame to the central region of the frame;
a center conveyor that is disposed to receive cut crop material from the left side conveyor and from the right side conveyor and to convey the cut crop material rearwardly, wherein the center conveyor is supported on the central region of the frame; and
an upper conveyor of an endless belt type that is disposed to receive, engage and downwardly compress an upper surface of the cut crop material conveyed rearwardly by the center conveyor;
wherein the upper conveyor and the center conveyor are adapted to convey the cut crop material rearward and into a feederhouse and an internal feederhouse conveyor of an agricultural combine, wherein the upper conveyor comprises an endless belt, and further wherein the endless belt of the upper conveyor comprises:
a generally vertical belt portion extending and spanning between a first roller and a second roller, the vertical belt portion being configured to engage an upper portion of a mat of the cut crop material and draw the mat downward;
a downwardly and rearwardly moving belt portion extending and spanning between the second roller and a third roller, the downwardly and rearwardly moving belt portion being configured to receive the mat of the cut crop material from the generally vertical belt portion and further compress the mat of the cut crop material as it draws the mat of the cut crop material downward and rearward;

a rearwardly moving belt portion extending and spanning between the third roller and a fourth roller, the rearwardly moving belt portion extending parallel to and opposite to the center conveyor; and an upwardly moving belt portion extending and spanning between the fourth roller and the first roller, wherein the center conveyor comprises an endless belt, and further wherein the mat of the cut crop material is compressed between the downwardly and rearwardly moving belt portion and the endless belt of the center conveyor as both the upper conveyor and the center conveyor are driven toward the rear of the agricultural harvesting head.

13. A harvester comprising:

a feeder house having an input opening and a feeder house conveyor extending rearwardly from the input opening;

a harvesting head supported by the feeder house forward the feeder house, the harvesting head comprising:
  a frame that extends laterally and is elongate;
  a left side conveyor that is supported on a left side of the frame and is configured to carry cut crop material laterally from a left side of the frame to a central region of the frame;
  a right side conveyor that is supported on a right side of the frame and is configured to carry cut crop material laterally from a right side of the frame to the central region of the frame;
  a center conveyor supported by the frame and comprising an endless belt to convey crop material rearwardly;
  an upper conveyor comprising an endless belt over and opposite to the center conveyor to sandwich crop material therebetween while conveying the crop material rearward into the input opening of the feeder house;
  a reciprocating knife supported by the head; and
  a second center conveyor between the left side conveyor and the right side conveyor, the second center conveyor having a forward portion adjacent the reciprocating knife and a rearward portion adjacent the center conveyor, the second conveyor to convey cut crop material directly to the center conveyor.

14. The harvester of claim 13, wherein the harvesting head is releasably hooked to the feeder house.

15. The harvester of claim 13, wherein the endless belt of the upper conveyor has a generally vertical belt portion that is configured to engage an upper portion of a mat of the cut crop material and draw the mat downward.

16. The harvester of claim 15, wherein the endless belt of the upper conveyor has a downwardly and rearwardly moving belt portion that is configured to receive the mat of the cut crop material from the generally vertical belt portion and further compress the mat of the cut crop material as it draws the mat of the cut crop material downward and rearward.

17. The harvester of claim 16, wherein the center conveyor comprises an endless belt, and further wherein the mat of the cut crop material is compressed between the downwardly and rearwardly moving belt portion and the endless belt of the center conveyor as both the upper conveyor and the center conveyor are driven toward the rear of the agricultural harvesting head.

* * * * *